United States Patent [19]

Sugiura

[11] 4,354,547
[45] Oct. 19, 1982

[54] DISCHARGE AIR TEMPERATURE CONTROL DEVICE HAVING REFERENCE TEMPERATURE CONTROL FUNCTION FOR AIR CONDITIONING SYSTEM FOR AUTOMOTIVE VEHICLES

[75] Inventor: Hiroyuki Sugiura, Konan, Japan
[73] Assignee: Diesel Kiki Co., Ltd., Saitama, Japan
[21] Appl. No.: 193,650
[22] Filed: Oct. 3, 1980
[30] Foreign Application Priority Data
Oct. 11, 1979 [JP] Japan .............. 54-140728[U]
[51] Int. Cl.³ .............................. F28F 27/02
[52] U.S. Cl. ........................ 165/25; 62/164; 165/27; 165/33; 165/43; 165/103
[58] Field of Search ............... 165/24, 25, 27, 42, 165/43, 33, 35, 103; 62/164

[56] References Cited

U.S. PATENT DOCUMENTS

| | | | |
|---|---|---|---|
| 3,263,739 | 10/1980 | Gaskill et al. | 165/25 X |
| 3,433,295 | 3/1969 | Avery | 165/103 X |
| 3,490,518 | 1/1970 | Herbon | 165/42 |
| 3,650,318 | 3/1972 | Avery | 165/103 X |
| 4,227,569 | 10/1980 | Wattin | 165/35 |
| 4,316,251 | 2/1982 | Saito et al. | 165/42 X |
| 4,323,111 | 4/1982 | Iijima | 165/25 |
| 4,325,426 | 4/1982 | Otsuka | 165/43 X |

FOREIGN PATENT DOCUMENTS

| | | | |
|---|---|---|---|
| 32735 | 7/1981 | European Pat. Off. | 165/43 |
| 802314 | 12/1950 | Fed. Rep. of Germany | 165/103 |
| 2361696 | 6/1975 | Fed. Rep. of Germany | 165/25 |
| 1001298 | 2/1952 | France | 165/33 |
| 55-123520 | 9/1980 | Japan | 165/43 |
| 2068593 | 8/1981 | United Kingdom | 165/42 |

Primary Examiner—Sheldon J. Richter
Attorney, Agent, or Firm—Frishauf, Holtz, Goodman and Woodward

[57] ABSTRACT

A discharge air temperature control device which is provided in an air conditioning system for automotive vehicles, the device comprising a lever assembly for adjusting the angular position of an air-mix damper, a driving circuit for driving the compressor of the air conditioning system, and a switching device for opening or closing the driving circuit in response to an air flow temperature signal supplied from a temperature sensor, characterized in that means is provided which is responsive to a change in the angular position of the lever assembly to vary a reference temperature value with reference to which the switching device opens or closes the driving circuit. The frequency of actuation of the compressor can thus be reduced to thereby save energy to be consumed by the air conditioning system. Further provided is means for selectively changing the above-mentioned reference temperature value into two levels which vary at different rates of variation relative to a change in the angular position of the lever assembly. Provision of this reference temperature changing means permits interruption of the operation of the compressor driving circuit when dehumidifying operation is not required, thus further saving energy to be consumed by the air conditioning system.

9 Claims, 4 Drawing Figures

DISCHARGE AIR TEMPERATURE CONTROL DEVICE HAVING REFERENCE TEMPERATURE CONTROL FUNCTION FOR AIR CONDITIONING SYSTEM FOR AUTOMOTIVE VEHICLES

BACKGROUND OF THE INVENTION

This invention relates to an air conditioning system of the so-called reheat air-mix type for use in automotive vehicles, and more particularly to a discharge air temperature control device for such systems.

In a conventional air conditioning system of the so-called reheat air-mix type for use in automotive vehicles, a heater core is arranged at a location downstream of an evaporator core, with an air-mix damper located in the vicinity of the heater core. The angular position of the air-mix damper determines the mixture ratio of cooled air supplied from the evaporator core through a by-pass passage and heated air supplied from the heater core which mixture ratio in turn determines the discharge air temperature. With this arrangement, control of the discharge air temperature is feasible only by adjustment of the angular position of the air-mix damper so as to obtain a desired passenger compartment temperature. Further, part of air dehumidified by the evaporator core is reheated by the heater core, which permits dehumidifying-heating operation (Dry Mode Operation) at any desired time.

However, according to the conventional air conditioning system of the reheat air-mix type, adjustment of the capacity or rate of operation of the evaporator is not possible during operation, as distinct from the so-called combined heater and cooling system. That is, the evaporator operates all the time during operation of the air conditioning system. Therefore, even when dehumidifying operation is not required, the compressor is driven so that the evaporator operates at maximum capacity, which results in consumption of a large amount of energy by the air conditioning system.

OBJECTS OF THE INVENTION

It is therefore a primary object of the invention to provide a discharge air temperature control device for use in air conditioning systems for automotive engines, in which a driving circuit for driving the compressor is controlled to be activated or deactivated as a function of the angular position of a lever assembly for controlling the angular position of an air-mix damper for adjusting the mixture ratio of heated air and cooled air, to thereby save energy to be consumed by a related air conditioning system.

It is another object of the invention to provide a discharge air temperature control device for use in air conditioning systems for automotive engines, in which a reference temperature value with reference to which the compressor driving circuit is activated or deactivated can be selectively changed into two levels which vary at different rates of variation relative to a change in the angular position of the lever assembly. Due to this reference temperature changing function, dehumidifying-heating operation is feasible. Further, when dehumidifying operation is not desired, the compressor driving circuit can be deactivated to save energy to be consumed by the air conditioning system.

The above and other objects, features and advantages of the invention will become more apparent from the ensuing description taken in connection with the accompanying drawings.

DETAILED DESCRIPTION

Referring to the accompanying drawings, there is shown an embodiment of the discharge air temperature control device according to the invention.

Figure 1:
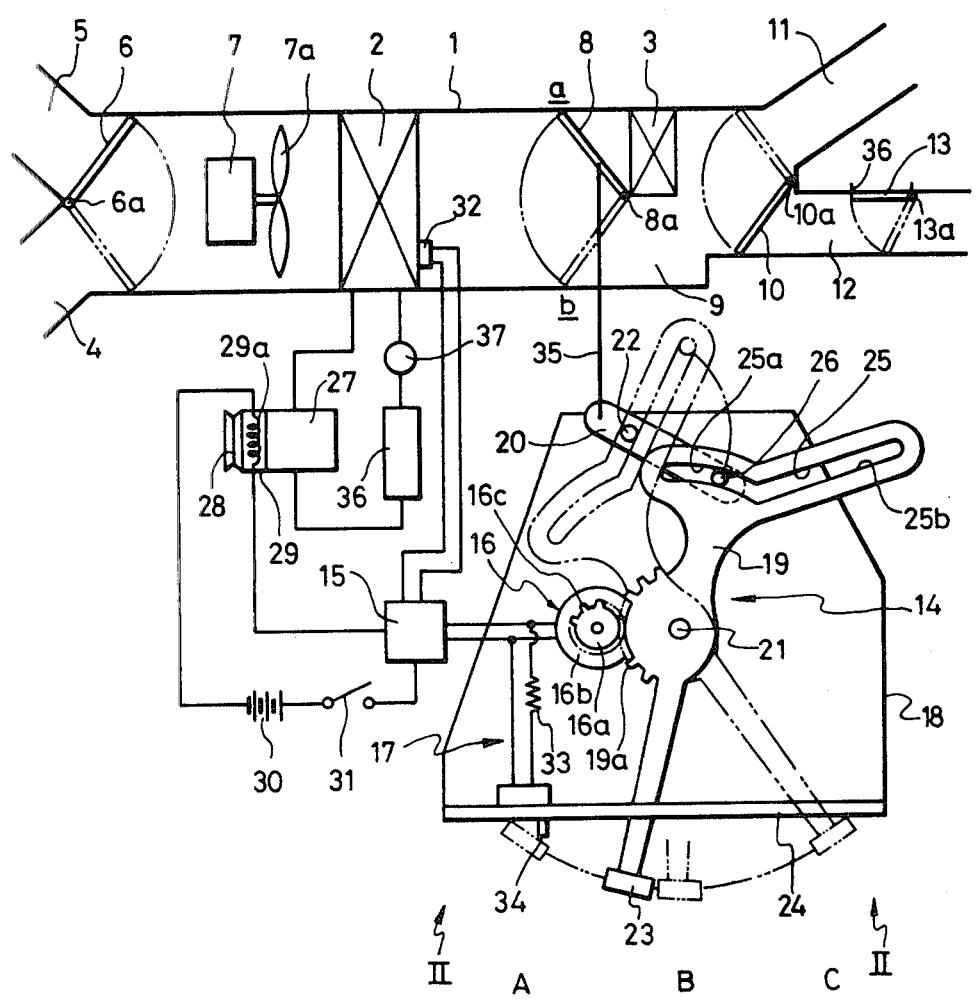
FIG. 1 is a schematic view of an air conditioning system for automotive engines which is provided with a discharge air temperature control device according to an embodiment of the present invention.

FIG. 1 schematically illustrates an air conditioning system for automotive engines in which the discharge air temperature control device according to the invention is installed. In the illustrated air conditioning system which is of the reheat air-mix type, an evaporator core 2 is arranged in an air flow passage within an air conditioner housing 1 and a heater core 3 is arranged at a location downstream of the evaporator core 2. The housing 1 is provided with an inside air or recirculated air inlet 4 and an outside air inlet 5 both arranged at a location upstream of the evaporator core 2 with an inside air-outside air change-over damper 6 disposed between the two inlets 4, 5 and pivoted at a support 6a for selectively opening and closing the inlets 4 and 5. A blower 7 which has a fan 7a is arranged between the damper 6 and the evaporator core 2 in such a manner than when the fan 7a is rotated, either inside air (recirculated air) or outside air may be introduced into the housing 1 and led to a downstream zone in the air flow passage, depending upon the angular position of the damper 6 which is controlled by an actuator, not shown, so as to introduce into the air flow passage inside air during cooling operation and outside air during other mode operation.

An air-mix damper 8 is arranged at a location upstream of the heater core 3 and pivoted at a support 8a, the angular position of which determines the amounts of cooled air supplied from the evaporator core 2 and passing the heater core 3 and cooled air supplied from the same core 2 and passing a by-pass passage 9 which is formed around the heater core 3. When the damper 8 is in an intermediate angular position range, heated air passing through the heater core 3 and cooled air passing through the by-pass passage 9 are mixed together at a zone downstream of the heater core 3. An upwardly directed outlet 11 and a downwardly directed outlet 12 are provided in the housing 1 at a location downstream of the heater core 3, with a mode selector damper 10 interposed between the two inlets 11, 12 and pivoted at a support 10a. Depending upon the angular position of this damper 10, either cooler mode or heater mode is selected to allow air fed to the zone downstream of the heater core 3 to be discharged, respectively, through the upwardly directed outlet 11 or the downwardly directed outlet 12. A defroster damper 13 is arranged at a location downstream of the downwardly directed outlet 12 and pivoted at a support 13a. When the damper 13 is at an angular position wherein a defroster outlet 36 is opened, windshield defroster mode is obtained. The mode selector damper 10 and the defroster damper 13 are adapted to be pivoted by actuators, not shown, to desired mode positions.

The discharge air temperature control device according to the invention comprises a lever assembly 14 for adjusting the angular position of the air-mix damper 8, a thermo switch 15 for controlling the operation of a compressor driving circuit which will be described hereinlater, a variable resistor 16 disposed to have its resistance value varied as a function of the angular position of the lever assembly 14 to thereby change the value of a preset reference temperature RT with reference to which the thermo switch 15 opens or closes the compressor driving circuit, and a selector 17 for selectively changing the above reference temperature value RT into two different levels as hereinlater described.

Figure 2:
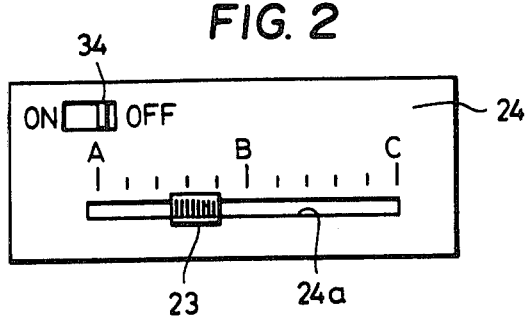
FIG. 2 is a view of the dash control panel as viewed in the direction of the arrows II—II in FIG. 1.

The lever assembly 14 comprises a supporting frame 18, a main lever 19 pivotally supported on the supporting frame 18, and a subsidiary lever 20 disposed in engagement with the main lever 19. The levers 19 and 20 are supported on the supporting frame 18, respectively, on pins 21 and 22 fixed to the frame 18 for pivotal movement relative to the frame 18. An operating lever 23 is formed integrally on the main lever 19 at a side remote from the subsidiary lever 20, in a manner outwardly protruding through a horizontal slot 24a formed as a guide in a dash control panel 24 which is erected on the supporting frame 18 (FIG. 2). As shown in FIG. 2, the dash control panel 24 bears a scale provided along the horizontal slot 24a, and the operating lever 23 can be pivoted in a continuous manner along a first operating range A-B (cooling-ventilation) and a second operating range B-C (ventilation-heating). The main lever 19 is formed with an elongated slot 25 at a side close to the subsidiary lever 20, in which slot is engaged a pin 26 which is secured to one end of the subsidiary lever 20. The lever 20 has its other end connected to one end of a wire 35 which has its other end connected to the air-mix damper 8. The above-mentioned slot 25 in the main lever 19 comprises two parts 25a and 25b arranged along its whole length. The pin 26 of the subsidiary lever 20 is adapted to engage the part 25a when the operating lever 23 (i.e., the main lever 19) is in the operating range A-B, and engage the part 25b when the lever 23 is in the operating range B-C. The part 25a of the slot 25 is in the form of a circular arc which has the pin 21 (pivoting point) of the main lever 19 as its center of curvature, while the part 25b is in the form of a straight line, and extends continuously from the part 25a and obliquely in a direction away from the above center of curvature (the pin 21).

With the above arrangement, when the operating lever 23 is pivotally displaced in unison with the main lever 19 within the first operating range A-B, the pin 26 of the subsidiary lever 20 is slid along the arcuate part 25a of the slot 25 in the main lever 19 to keep the subsidiary lever 20 from pivoting so that the air-mix door 8 is held at its maximum cooling position a in FIG. 1 wherein the air flow passage in the housing 1 is closed at a zone upstream of the heater core 3. On the other hand, when the operating lever 23 is pivotally displaced within the second operating range B-C, the pin 26 of the subsidiary lever 20 is slid along the linear part 25b of the slot 25 in the main lever 19 to cause pivoting of the subsidiary lever 20 so that the air-mix damper 8 is continuously pivoted from its maximum cooling position a to its maximum heating position b or vice versa. The angular position of the air-mix damper 8 relative to the operating ranges A-B, B-C is shown by the solid line in FIG. 3.

The thermo switch 15 is arranged across the compressor driving circuit which is formed by the solenoid 29a of an electromagnetic clutch 29 for transmitting rotating torque from a pulley 28 to a refrigerant compressor 27, a power source 30 and a main switch 31. The compressor 27 cooperates with the evaporator, the condenser 36, the expansion valve 37, etc. to form a refrigeration cycle, like a conventional arrangement. The pulley 28 is rotated by an engine, not shown, provided in a vehicle, now shown, on which the air conditioning system is installed.

The thermo switch 15 is responsive to an output signal from a temperature sensor 32 mounted e.g. on the discharge port of the evaporator core 2 to open or close the compressor driving circuit. The thermo switch 15 is adapted to close the compressor driving circuit when an evaporator core discharge air temperature exceeds the reference temperature value RT and open the same circuit when the former temperature drops below the latter value. The reference temperature value RT can be varied in a continuous or stepless manner by the variable resistor 16. This reference temperature value can also be changed into two different levels by the selector 17.

The variable resistor 16 comprises a rotating element 16a and a resistance disc 16b. Rotation of the rotating element 16a causes sliding of a slider, not shown, which is secured to the element 16a, on the resistance surface of the resistance disc 16b to provide a continuously or steplessly varying resistance value so that a correspondingly varying electric voltage is supplied to the thermo switch 15. This change of the electric voltage leads to a change in the value of the reference temperature with reference to which the thermo switch 15 opens or closes the compressor driving circuit. The rotating element 16a has teeth 16c formed along its periphery which is in meshing engagement with teeth 19a formed on the periphery of a central portion of the main lever 19 of the lever assembly 14. Thus, as the main lever 19 is pivotally displaced within the whole operating range A-C, the reference temperature value RT is automatically continuously varied.

Figure 3:
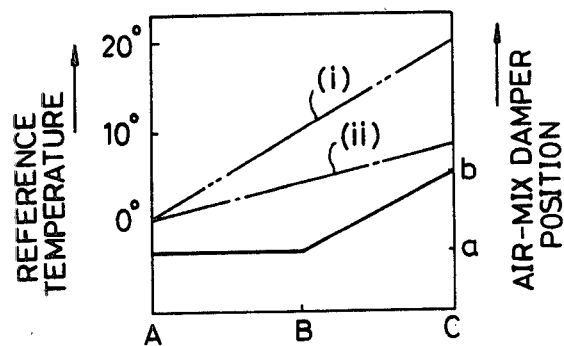
FIG. 3 is a graph showing the reference temperature value for actuation of the thermo switch and the angular position of the air-mix damper as a function of the angular position of the lever assembly.

The selector 17 comprises a pair of series-connected fixed resistance 33 and change-over switch 34 which are connected to the variable resistor 16 in parallel therewith. The change-over switch 34 is mounted on the dash control panel 24 and can take two positions "ON" and "OFF". If the switch 34 is at "OFF", no electric current flows in the fixed resistance 33, while at "ON" electric current flows in the resistance 33. Therefore, as shown in FIG. 3, the reference temperature value RT is varied in a linear manner as a function of the change of the angular position of the lever assembly 14 by means of the variable resistor 16 the resistance value of which varies in response to a change in the angular position of the lever assembly 14. In addition, when the change-over switch 34 of the selector 17 is at "OFF", the slope of variation of the reference temperature value RT is relatively larger as represented by the chain line (i) in FIG. 3, while with the switch 34 at "ON", the slope is relatively smaller as represented by the chain line (ii) in FIG. 3, thus providing two levels of reference temperature value RT which vary at different rates of variation with respect to the change of the angular position of the lever assembly 14. More specifically, particularly in the operating range B-C, the reference temperature value RT is higher with the switch 34 at "OFF", while it is lower with the switch 34 at "ON", providing a temperature difference of from about 5° C. to about 10° C. between the two positions "ON" and "OFF" of the switch 34.

With the above arrangement, if the lever assembly 14 is operated or angularly displaced within the first operating range A-B under the condition that the main switch 31 is closed, the air-mix damper 8 is held at its maximum cooling position, whereby no air is supplied to the heater core 3, that is, air passing through the evaporator core 2 is delivered through the by-pass passage 9 into the passenger compartment. On this occasion, control of the discharge air temperature is effected by varying the rate of operation of the evaporator. That is, as the angular position of the main lever 19 of the lever assembly 14 is varied, the resistance value of the variable resistor 16 is varied to vary the reference temperature value RT. If the reference temperature value has a higher value, the rate of operation of the compressor driving circuit decreases, and if the reference temperature value has a lower value, the above rate of operation increases. With the lever assembly 14 within the first operating range A-B, if the selector 17 is set at "OFF", the reference temperature value RT becomes higher so that the rate of operation of the compressor 27 slightly decreases as compared with the case where the selector 17 is set at "ON".

On the other hand, as the lever assembly 14 is angularly displaced within the second operating range B-C, the air-mix damper 8 is correspondingly angularly displaced in a continuous manner between the maximum cooling position a and the maximum heating position b. Thus, the angular position of the air-mix damper 8 can be adjusted so as to obtain a desired amount of air supplied from the evaporator core 2 to the heater core 3. Heated air supplied from the heater core 3 is mixed with cooled air supplied from the evaporator core 2 and passing through the by-pass passage 9 into a mixture which is then blown into the passenger compartment. On this occasion, if the selector 17 is at "OFF", the reference temperature value RT is on the higher level which is represented by the chain line (i) in FIG. 3 and accordingly the frequency at which the compressor driving circuit is closed is relatively smaller, rendering the compressor 27 substantially inoperative. If the selector 7 is at "ON", the reference temperature value RT is on the lower level which is represented by the chain line (ii) in FIG. 3 so that the frequency at which the compressor driving circuit is closed increases, which correspondingly increases the rate of operation of the compressor 28. While the compressor 28 is driven, air is dehumidified in passing the evaporator core 2 and the dehumidified air is blown into the passenger compartment, that is, the dehumidifying-heating mode operation is carried out.

Figure 4:
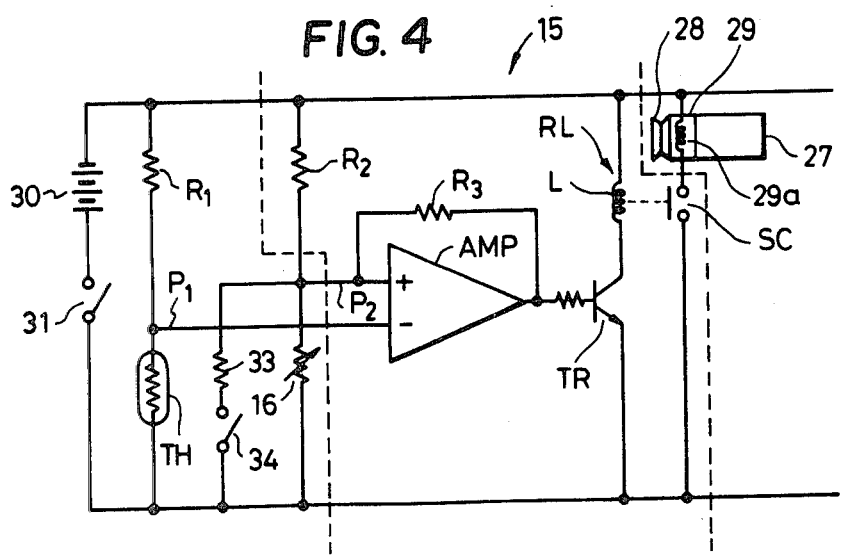
FIG. 4 is a diagrammatic view showing an electrical circuit as an example of the construction of the thermo switch in FIG. 1.

FIG. 4 shows an example of the construction of the thermo switch 15. The thermo switch 15 includes an amplifier AMP which forms part of a comparator. Connected to the inverting input terminal of the amplifier AMP is the junction of a resistance $R_1$ and a thermistor TH which are connected in series to each other. The resistance $R_1$ and the thermistor TH form the temperature sensor 32 in FIG. 1. Connected to the non-inverting input terminal of the amplifier AMP is the junction of a fixed resistance $R_2$ and the variable resistor 16 which are connected in series to each other. The fixed resistance 33 and switch 34 of the selector 17 are connected to the variable resistor 16 in parallel therewith. The amplifier AMP has an output terminal connected to the base of an NPN transistor TR which has its collector connected to one end of the coil L of a relay RL and its emitter grounded. The relay RL has its switch contacts SC connected in series to the solenoid 29a of the electromagnetic clutch 29 interposed between the pulley 28 and the compressor 27. The relay RL is a normally closed type, that is, when the coil L is in a deenergized state, the switch contacts SC are closed, and when the coil L is in an energized state, the switch contacts SC are opened.

A positive feedback resistance $R_3$ is connected between the output terminal and non-inverting terminal of the amplifier AMP. Positive feedback of the output of the amplifier AMP through this resistance $R_3$ eliminates the phenomenon that the binary output of the amplifier AMP fluctuates between "1" and "0" due to slight fluctuations in the voltage at the terminal of the thermistor TH connected to the resistance $R_1$ or noise, to thus assure stable operation of the comparator.

With the above arrangement, when the temperature of air discharged from the evaporator core 2 is so low that the terminal potential $P_1$ of the thermistor TH is higher than the potential $P_2$ at the junction of the resistance $R_2$ and the variable resistor 16, the amplifier AMP produces output "0" and accordingly the transistor TR is off. Therefore, the relay RL has its coil L deenergized to have the contacts SC closed to thereby close the solenoid 29a of the electromagnetic clutch 29 so that the rotation of the pulley 28 is transmitted to the compressor 27 to drive same.

Then, when the temperature of air discharged from the evaporator core 2 increases so that the terminal potential $P_1$ of the thermistor TH drops below the potential $P_2$, the relay RL is opened in a manner contrary to the above-mentioned manner to energize the solenoid 29a of the electromagnetic clutch 29, rendering the compressor 27 inoperative.

As the operating lever 23 is displaced from position A to position B or from position B to position C, the resistance value of the variable resistor 16 decreases, which correspondingly lowers the potential $P_2$, resulting in a decrease in the reference temperature value RT. On the contrary, as the operating lever 23 is displaced from position C to position B or from position B to position A, the resistance value of the variable resistor 16 increases, resulting in an increase in the reference temperature value RT. If the selector 17 is at "ON", the resistance 33 is in conduction due to closure of the switch 34 which further lowers the potential $P_2$ to a lower level so that the frequency of actuation of the compressor driving circuit, i.e., the compressor 27 is increased, whereas if the selector 17 is at "OFF", the potential $P_2$ is elevated due to nonconduction of the resistance 33 to decrease the frequency of actuation of the compressor 27.

In the illustrated embodiment, it is noted that irrespective of whether the selector 17 is at "ON" or "OFF", the reference temperature value RT with reference to which the thermo switch 15 operates is varied in a linear manner as indicated by the chain line (i) or (ii), as the lever assembly 14 is displaced. However, another means may be used which allows the reference temperature value RT to vary in a non-linear manner in response to displacement of the lever assembly 14, so far as a difference of 5° C. or more in the reference temperature value RT is obtained between positions "ON" and "OFF", particularly in the second operating range B-C. The above other means may include, for instance, a variable resistance of the type that a plurality of fixed resistances having different values are selected by rotating a rotary switch.

Although in the above embodiment, the selector 17 is comprised of the fixed resistance 33 and the changeover switch 34, alternatively the selector 17 may be comprised of a device which is arranged to mechanically displace the variable resistor 16 relative to the main lever 19. With such a device, when the lever assembly 14 is displaced from the first operating range A-B to the second operating range B-C, the rotating element 16a of the variable resistance 16 engages the main lever 19 with the selector 17 set at the "OFF" position, while the former is out of engagement with the latter with the selector 17 set at the "ON" position so that at the "ON" position of the selector 17 the resistance value of the variable resistor 16 remains unchanged and held at a value which the resistor 16 had in the first operating range A-B so as to keep the value of the reference temperature value RT for the thermo switch 15 from increasing with displacement of the main lever 19. With this arrangement, with the selector 17 in the "ON" position, the frequency of actuation of the compressor 27 can be elevated to the same extent as in the embodiment previously described.

Obviously many modifications and variations of the present invention are possible in the light of the above teachings. It is therefore to be understood that within the scope of the appended claims, the invention may be practiced otherwise than as specifically described.

What is claimed is:

1. A discharge air control device for use in an air conditioning system for automotive engines, the air conditioning system including a compressor, an electrical circuit for driving said compressor, an evaporator core operatively connected to said compressor, a heater core arranged at a location downstream of said evaporator core, a passage by-passing said heater core, and a pivotable air-mix damper disposed to guide an air flow from said evaporator core, respectively, through said by-pass passage alone at a first angular position thereof, through said heater core along at a second angular position thereof, and through both said by-pass passage and said heater core at a position between said first angular position and said second angular position, said discharge air control device comprising:
lever means coupled to said air-mix damper for controlling the angular position of said air-mix damper, said lever means being disposed to hold said air-mix damper at said first angular position when said lever means is angularly displaced within a first angular range, and to allow said air-mix damper to be pivoted in a continuous manner within a range between said first angular position and said second angular position when said lever means is angularly displaced within a second angular range;
a temperature sensor for detecting the temperature of said air flow from said evaporator core;
switch means coupled to said temperature sensor and operable to close said electrical circuit to actuate said compressor when said temperature sensor produces an output signal exceeding a value corresponding to a predetermined reference value of said air flow temperature, and to open said electrical circuit to render said compressor inoperative when said temperature sensor produces an output which is below a value corresponding to said reference value of said air flow temperature; and
means responsive to a change in the angular position of said lever means to vary said reference value of said air flow temperature.

2. The discharge air temperature control device as claimed in claim 1, wherein said lever means comprises: a support; a first lever pivotally supported on said support and externally operatable; a second lever pivotally supported on said support, said second lever being connected at one end thereof to said air-mix damper and engaging at the other end thereof with said first lever; and angular position control means operable to keep said second lever from pivoting to hold said air-mix damper at said first angular position thereof when said first lever is pivoted within said first angular range of said lever means, and to allow said second lever to be pivoted correspondingly to pivoting of said first lever to cause said air-mix damper to be pivoted in a continuous manner within a range between said first angular position and said second angular position thereof when said first lever is pivoted within said second angular range of said lever means.

3. The discharge air temperature control device as recited in claim 1, wherein said angular position control means comprises an elongate slot formed in said first lever, said elongate slot having a first part in the form of a circular arc having the pivoting point of said first lever as a center of curvature thereof and a second part in the form of a straight line continued from said first part and extending obliquely in a direction away from said center of curvature, said second lever being engaged in said elongate slot.

4. The discharge air temperature control device as claimed in claim 1, including an electromagnetic clutch having a solenoid and operable to transmit rotating torque to said compressor, said solenoid forming part of said electrical circuit, wherein said switch means comprises: a comparator having an input terminal supplied with an output voltage from said temperature sensor and another input terminal supplied with a voltage corresponding to said reference value of said air flow temperature; a transistor connected to an output terminal of said comparator and being turned on or off in response to an output from said comparator; and a relay having a coil connected to said transistor and switch contacts connected to said solenoid of said electromagnetic clutch; whereby said coil is energized or deenergized in response to on and off states of said transistor to selectively cause clutch engagement or clutch disengagement of said electromagnetic clutch.

5. The discharge air temperature control device as claimed in claim 4, wherein said means for varying said reference value of said air flow temperature comprises a variable resistor arranged to have a resistance value varying in response to a change in the angular position of said lever means, said variable resistor being connected to said another input terminal of said comparator, whereby said variable resistor supplies a voltage varying as a function of a change in said resistance value thereof to said other input terminal of said comparator.

6. The discharge air temperature control device as claimed in claim 5, wherein said variable resistor comprises: a rotating element having a slider and disposed in meshing engagement with said first lever for pivoting in unison therewith when said first lever is pivoted; and a resistance element having a resistance surface on which said slider is slid.

7. The discharge air temperature control device as claimed in claim 1, wherein said means for varying said reference value of said air flow temperature includes means for selectively changing said reference value of said air flow temperature into two levels varying at different rates of variation when said lever means is angularly displaced within said first and second angular ranges.

8. The discharge air temperature control device as claimed in claim 7, comprising: an electromagnetic clutch for transmitting rotating torque to said compressor, said electromagnetic clutch having a solenoid forming part of said electrical circuit; a comparator having first and second input terminals, said comparator having said first input terminal supplied with an output voltage from said temperature sensor; means responsive to an output from said comparator to energize or deenergize said solenoid of said electromagnetic clutch; a variable resistor having a varying resistance value and adapted to supply a voltage varying as a function of said varying resistance value thereof to said second input terminal of said comparator, said variable resistor comprising said means for varying said reference value of said air flow temperature; and a fixed resistance and a switch connected in series, said series combination of said fixed resistance and said switch being connected to said variable resistor in parallel therewith, said fixed resistance and said switch comprising said means for changing said reference value of said air flow temperature into said two different levels.

9. The discharge air temperature control device as claimed in any one of claims 1 through 8, wherein said evaporator core has an air discharge port, said temperature sensor being mounted on said air discharge port.

* * * * *